(12) United States Patent
Iwata et al.

(10) Patent No.: US 8,753,431 B2
(45) Date of Patent: Jun. 17, 2014

(54) BUBBLE REMOVAL METHOD AND BUBBLE REMOVAL DEVICE

(75) Inventors: Shuichi Iwata, Nagoya (JP); Hideki Mori, Nagoya (JP)

(73) Assignee: National University Corporation Nagoya Institute of Technology, Aichi (JP)

(*) Notice: Subject to any disclaimer, the term of this patent is extended or adjusted under 35 U.S.C. 154(b) by 229 days.

(21) Appl. No.: 13/389,925

(22) PCT Filed: Aug. 5, 2010

(86) PCT No.: PCT/JP2010/063238
§ 371 (c)(1),
(2), (4) Date: Feb. 10, 2012

(87) PCT Pub. No.: WO2011/018972
PCT Pub. Date: Feb. 17, 2011

(65) Prior Publication Data
US 2012/0137889 A1    Jun. 7, 2012

(30) Foreign Application Priority Data
Aug. 12, 2009  (JP) ................................. 2009-187352

(51) Int. Cl.
*B01D 19/02* (2006.01)
(52) U.S. Cl.
USPC ................... 95/242; 95/266; 95/260; 96/176; 96/193; 96/194
(58) Field of Classification Search
USPC .............. 95/242, 266, 260; 96/176, 193, 194
See application file for complete search history.

(56) References Cited

U.S. PATENT DOCUMENTS

| 4,385,909 A * | 5/1983 | Starr ............................... 95/266 |
| 7,959,715 B2 * | 6/2011 | Kavazov et al. ................... 96/6 |
| 8,540,799 B2 * | 9/2013 | Mueller et al. .................... 95/26 |

FOREIGN PATENT DOCUMENTS

| JP | A-04-243507 | 8/1992 |
| JP | U-05-051405 | 7/1993 |
| JP | A-07-100423 | 4/1995 |
| JP | A-07-144104 | 6/1995 |
| JP | A-08-131711 | 5/1996 |
| JP | A-08-187404 | 7/1996 |
| JP | A-10-066802 | 3/1998 |
| JP | A-2007-054680 | 3/2007 |

OTHER PUBLICATIONS

Ishii et al., "Concepts in Basic Bubble and Foam Engineering," Techno-System Co., Ltd., pp. 588-605 and 753-773, 2005.
Iwata et al "Pressure-Oscillatory Defoaming for Shear-thinning Fluids," *The Society of Chemical Engineers*, vol. 33, No. 4, pp. 294-299, 2007 (w/ Partial Translation).
International Search Report issued in Application No. PCT/JP2010/063238; Dated Nov. 9, 2010 (With Translation).

* cited by examiner

*Primary Examiner* — Duane Smith
*Assistant Examiner* — Douglas Theisen
(74) *Attorney, Agent, or Firm* — Oliff PLC (57) ABSTRACT

A bubble removal method is for removing a bubble from liquid whose viscosity is reduced when shear occurs. A vessel, including a liquid inlet and multiple liquid outlets, whose volumetric capacity is variable and a means for giving resistance to the passage of liquid between the inside and the outside of the vessel are used. The liquid is passed through the vessel against resistance and the volumetric capacity of the vessel is increased and reduced. The interior of the vessel is depressurized and pressurized by the means for giving resistance to the passage of liquid in conjunction with increase and reduction in the volumetric capacity of the vessel.

30 Claims, 4 Drawing Sheets

BUBBLE REMOVAL METHOD AND BUBBLE REMOVAL DEVICE

TECHNICAL FIELD

The present invention relates to a method for removing a bubble contained in liquid and a device for removing a bubble contained in liquid.

BACKGROUND ART

It is not easy to remove a bubble in highly viscous fluid because of its viscosity, and various defoaming methods have been used. Brief description will be given to the principle and features of the conventional defoaming method described in NPTL 1.

1. Still Stand Method

A solution to be defoamed is left at rest in a large tank or the like. Ascending force arising from the density difference between a bubble and liquid is used as propulsive force and the bubble is removed by natural ascending speed determined by it balanced with the viscous force at the bubble surface.

2. Temperature Rise Method

A non-deforming solution is heated to reduce the viscosity of the solution and increase the natural ascending speed of the bubble.

3. Vacuum Defoaming

A solution to be defoamed is placed under reduced pressure to increase the diameter of a bubble. Then the solution is defoamed by acceleration in the natural ascending speed of the bubble due to increase in ascending force. This method is characterized in that it does not involve temperature rise and is effective to substances and the like that react to heating.

With respect to this, PTL 1 discloses a continuous defoaming device for emulsion utilizing pressure reduction. This continuous defoaming device is made up of a pressure reducing vessel that houses a hollow disk-shaped rotating body comprised of: a circular disk-shaped bottom plate having a concentric lower collision plate so provided that it is in an upright posture or inclined toward the circumferential side; and a top plate having a concentric upper collision plate positioned alternately with the lower collision plate and so provided that it is in a drooping posture or inclined toward the circumferential side and supported by the bottom plate. The pressure reducing vessel includes: a pipeline for supplying liquid containing a bubble to the central part of the disk-shaped rotating body; and a pressure reducing means.

PTL 2 discloses a continuous defoaming device for bubbles mixed in paint on a roll. This continuous defoaming device is a continuous defoaming device configured to remove bubbles mixed in paint in a vacuum chamber. It includes: a defoaming roll means comprised of a roll for transferring paint from the atmosphere to the vacuum chamber, a roll for discharging paint from the vacuum chamber into the atmosphere, and a group of rolls for vacuum sealing the area between these rolls and the vacuum chamber wall; and a paint recovery means for recovering defoamed paint on the roll for discharging paint from the vacuum chamber.

4. Centrifugal Defoaming by Planetary Stirring

This is a defoaming method utilizing the density difference between gas and liquid. In centrifugal defoaming by planetary stirring, a bubble placed in a vessel is caused to collide with the inner wall of the vessel by centrifugal force to crash it. The crushed bubble is dissolved in a solution and is thereby removed. With respect to continuous centrifugal defoaming that does not use planetary stirring, the following two patents are published:

PTL 3 relates to a multistage centrifugal defoaming device. Several rotary cylinders that exert centrifugal force on liquid are provided and a ring-shape scattering interception component is provided thereabove. Scattering liquid material is once received and centrifugal defoaming is thereby sequentially and repeatedly carried out. The patent literature also describes that it can also be incorporated in a manufacturing line or the like and continuously operated by continuously putting in liquid material from an injection port and continuously recovering the defoamed liquid.

PTL 4 relates to a continuous defoaming device. A rotary cylinder rotated by a motor is placed in a vacuum vessel. Liquid material is injected thereinto from an injection port by an injection pump and the liquid material is caused to fly from the upper part of the rotary cylinder toward the wall surface of the vacuum vessel by centrifugal force. Accumulation of the defoamed liquid material at the lower part of the vacuum vessel is detected by a liquid level sensor and it is discharged from a discharge port by a discharge pump. The patent literature describes that continuous defoaming can be carried out automatically regardless of the initial rate of bubble content by taking the following measure: the liquid level sensor is provided and the discharge pump is controlled from a control panel so that the liquid level of the defoamed liquid material accumulated at the lower part of the vacuum vessel is within an appropriate range.

PTL 5 and NPTL 2 disclose bubble removal methods using a vessel (closed vessel) so structured that its volumetric capacity can be varied. In these methods, a viscous fluid containing a bubble is sealed in the vessel and the volumetric capacity of the vessel is varied using vibration. The interior of the vessel is thereby alternately depressurized and pressurized to increase and reduce the volume of the bubble and remove the bubble.

In these conventional arts, the viscous fluid is an incompressive fluid. Since the volume of a bubble is varied according to pressure, the volume of the bubble is increased and reduced by alternately depressurizing and pressuring the interior of the vessel. As the result of the volume of the bubble being increased and reduced, a shear flow is produced around the bubble.

The viscous fluid used in these conventional arts has a property that its apparent viscosity is reduced by shear. For this reason, when a shear flow is produced around a bubble, the apparent viscosity of the viscous fluid in proximity to the bubble is reduced. Thus the viscosity resistance against the natural ascent of the bubble is reduced and the natural ascending speed of the bubble is increased. As a result, the bubble can be removed from the viscous fluid.

CITATION LIST

Patent Literature

[PTL 1]
Japanese Unexamined Patent Publication No. JP-A-Hei 7 (1995)-144104
[PTL 2]
Japanese Unexamined Patent Publication No. JP-A-Hei 7 (1995)-100423
[PTL 3]
Japanese Unexamined Patent Publication No. JP-A-Hei 8 (1996)-187404
[PTL 4]
Japanese Unexamined Patent Publication No. JP-A-Hei 8 (1996)-131711

[PTL 5]
Japanese Unexamined Patent Publication No. JP-A-2007-54680
[PTL 6]
Japanese Unexamined Utility Model Application Publication No. JP-UM-A-Hei 5 (1993)-51405

Non-Patent Literature

[NPTL 1]
Concepts in Basic Bubble and Foam Engineering, ed. Yoshio Ishii et al. Techno-System Co. Ltd., 2005
[NPTL 2]
Shuichi Iwata, Shingo Uchida, Kazuto Ishida, and Hideki Mori, Kagaku Kogaku Ronbunshu, vol. 33, No. 4, 2007, pp. 294-299

SUMMARY OF INVENTION

Technical Problem

However, the above-mentioned conventional arts involve the following problems:
1. The still stand method involves the problem that it is necessary to leave a solution at rest for a long time for defoaming. Continuous operation is possible. When a large tank is used, however, the solution is retained therein for a long time. Therefore, there is a possibility that an unstable substance is decomposed or a bubble is involved in a complicated flow at a discharge portion.
2. The temperature rise method cannot be applied to cases where a thermosetting resin material whose physical properties are changed by temperature rise or a thermally unstable substance is contained. The principle of separation on which the method is based is utilization of a difference in ascending force and it involves the same problem as the still stand method also with respect to continuous processing.
3. When a non-defoaming solution contains a volatile component, the volatile component in the solution is evaporated by pressure decrease and this changes the properties of the solution. Therefore, the vacuum defoaming cannot be used in this case. Since the pressure in a solution depends on liquid height, the following problem arises: the effect of defoaming is reduced with increase in depth. When defoaming is continuously applied, it is difficult to gradually lower the liquid pressure and a volatile component in a solution may be suddenly evaporated at some point in time. Since a vacuum system is used, a problem of increased cost of equipment also arises.
4. The centrifugal defoaming method using planetary stirring is of batch type and this poses a problem of a low throughput. A belt and a gear are placed on the bottom side of a cup far away from the center of revolution by a motor and the cup is caused to perform sun-and-planet motion. Therefore, the belt and the gear are severely worn by centrifugal force arising from rotation and failures frequently occur. Since the structure is complicated and the mass of the rotating body is very large, a problem of increased cost arises.

With the device in PTL 1, the following problem arises with respect to viscoelastic fluid: when the liquid flies from the rotating body, the extensional viscosity of the liquid is increased and this causes a cobwebbing phenomenon. At this time, the interface is rapidly increased and there is a possibility that a large amount of bubbles is mixed in.

When a volatile component is contained, it is evaporated by pressure decrease and the properties of the solution are changed. Therefore, the method in PTL 2 cannot be applied to this case. The structure of a vacuum chamber including a rotating roll is complicated and incidental equipment, such as a vacuum pump, is also required.

When the method in PTL 3 or PTL 4 is applied to viscoelastic fluid, the following problem arises: when the liquid flies from the rotating body, the extensional viscosity of the liquid is increased and this causes a cobwebbing phenomenon. When it moves from the circular disk-shaped rotating body to the circular disk-shaped bottom plate, the interface is rapidly increased due to the cobwebbing phenomenon and there is a possibility that a bubble is mixed in.

The methods in PTL 5 and NPTL 2, which are defoaming methods utilizing pressure oscillation, bring about the defoaming effect on viscous fluid. However, since they are batch bubble removal methods using a closed vessel, they involve a problem that a bubble cannot be efficiently removed.

PLT 6 describes a defoaming device so configured as to pass liquid through a non-closed vessel and continuously remove bubbles. This conventional art removes only a bubble contained in water (low-viscous fluid). The patent literature does not refer to removal of a bubble contained in highly viscous fluid at all. That is, in PLT 6, no mention is made to that the natural ascending speed of a bubble is increased by increasing and reducing the volume of the bubble as in PLT 5.

The invention has been made in consideration of the above-mentioned problems associated with the conventional arts. It is an object of the invention to efficiently remove a bubble contained in liquid.

Solution to Problem

In order to achieve the above-described object, the invention according to a first aspect is a bubble removal method for removing bubbles from liquid whose viscosity is reduced when shear occurs, including:
using a vessel, including a liquid inlet and a plurality of liquid outlets, whose volumetric capacity is variable and a means for giving resistance to the passage of the liquid between inside and outside of the vessel;
causing the liquid to pass through the vessel against the resistance and increasing and decreasing the volumetric capacity of the vessel; and
causing the means for giving resistance to the passage of liquid to depressurize and pressurize an interior of the vessel in conjunction with increase and reduction in the volumetric capacity of the vessel.

This makes it possible to achieve both letting liquid pass through the vessel and increasing and reducing the volumetric capacity of the vessel to depressurize and pressurize the interior of the vessel. For this reason, the volume of a bubble contained in liquid passing through the vessel can be increased and reduced to increase the natural ascending speed of the bubble; therefore, the bubble can be efficiently removed.

In order to achieve the above-described object, the invention according to another aspect includes:
a vessel, including a liquid inlet and a plurality of liquid outlets, whose volumetric capacity is variable;
a volumetric capacity varying means that is actuated for the vessel and increases and reduces the volumetric capacity of the vessel; and
a means for giving resistance to the passage of the liquid between the inside and the outside of the vessel so that, when the volumetric capacity varying means increases and reduces the volumetric capacity of the vessel, an interior of the vessel is depressurized and pressurized.

This makes it possible to obtain the same action and effect as in the invention according to the first aspect.

The "liquid whose viscosity is reduced when shear occurs" in the above invention does not mean only liquids whose solution viscosity is reduced by shear over all the range of shear rate. It also includes liquids whose solution viscosity is reduced within part of the range of shear rate.

DESCRIPTION OF EMBODIMENTS

Hereafter, description will be given to embodiments in which the invention is materialized.

First Embodiment

In relation to the first embodiment, the effect of the invention will be described through comparison of the following observed after a bubble is produced in the device: the movement trajectory of the bubble observed when the invention is not used and the movement trajectory of the bubble observed when the invention is used.

Figure 1:
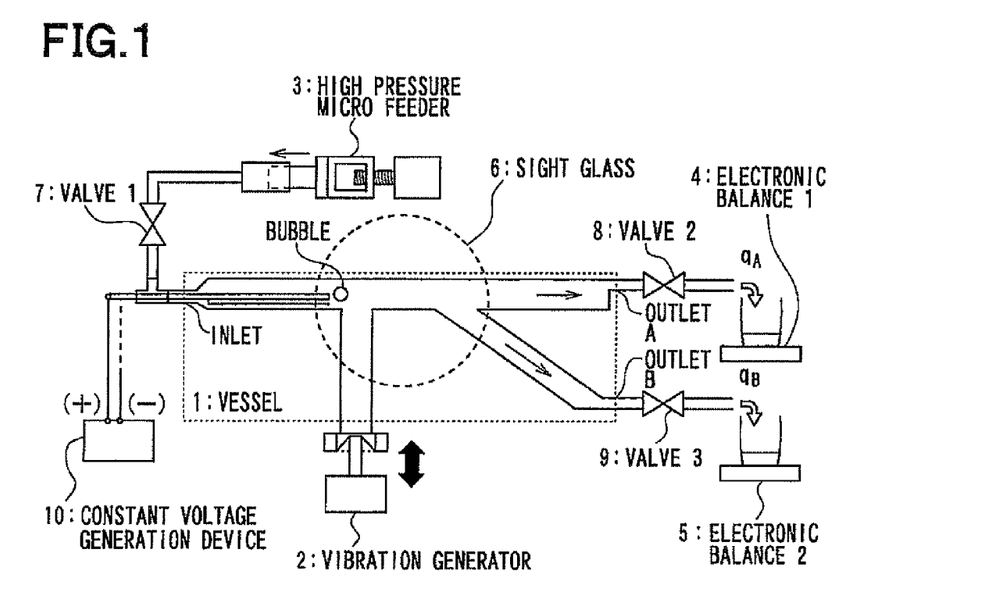
FIG. 1 is a drawing illustrating the overall configuration of a continuous defoaming device in a first embodiment of the invention.

As illustrated in FIG. 1, the device is comprised of a vessel 1, a vibration generator 2, a high-pressure micro feeder 3, and electronic balances 4, 5 on which beakers are placed. Using this device, a bubble in the vessel 1 is separated by moving the bubble to one outlet. Specifically, the vessel 1 has one inlet for liquid (liquid inlet) and two outlets A, B for liquid (liquid outlets) and the trajectory of the bubble can be observed through a sight glass 6 for visualization.

The outlet A is an upper outlet positioned at the upper part of the vessel 1 and the outlet B is a lower outlet positioned below the outlet A. The high-pressure micro feeder 3 feeds liquid to the inlet of the vessel 1. The liquid fed to the inlet of the vessel 1 flows in the vessel 1 toward the outlets A, B.

The vibration generator 2 is connected to a film-like movable part attached to the lower part of the vessel 1 and gives pressure oscillation (internal pressure oscillation) to the vessel 1. In this example, the movable part of the vessel 1 is formed of an elastic body such as rubber. The vibration generator 2 elastically deforms the movable part of the vessel 1. This makes it possible to increase and reduce the volumetric capacity of the vessel 1.

Valves (throttle valves) 7, 8, 9 are installed in the piping areas connected to the vessel 1. The pressure oscillation (internal pressure oscillation) of the vessel 1 is maintained and the flow ratio on the outlet side is set by adjusting the valve opening of each valve (significantly narrowing down the valve opening).

Since the valve opening of each of the valves 7, 8, 9 is significantly narrowed down, the flow resistance of each of the valves 7, 8, 9 is significantly increased. As a result, the interior of the vessel 1 is depressurized and pressurized when the vibration generator 2 increases and reduces the volumetric capacity of the vessel 1. The high-pressure micro feeder 3 pressure feeds liquid against the flow resistance of each of the valves 7, 8, 9.

That is, the valves 7, 8, 9 form a means for giving resistance to the passage of liquid between the inside and the outside of the vessel 1; and the high-pressure micro feeder 3 forms a means for pressure feeding liquid so that the liquid passes through the vessel 1 against the resistance of each of the valves 7, 8, 9.

In this example, the pumping pressure of the high-pressure micro feeder 3 is set to 0.4 to 5 in atmospheric pressure or so but it may be a higher or lower pumping pressure. Favorable pumping pressure relates to the size of a bubble and the performance of the vibration generator 2. More specifically, a large bubble is prone to be shrunk; therefore, the defoaming effect on large bubbles can be obtained even though the pumping pressure of the high-pressure micro feeder 3 is low. When the performance of the vibration generator 2 is high, it is possible to expand and shrink a bubble even though the pumping pressure of the high-pressure micro feeder 3 is high. Therefore the defoaming effect can be obtained.

To introduce bubbles to be defoamed by the high-pressure feeder deforming, a method is used in which a constant voltage generation device 10 is energized only for a predetermined time and a bubble is generated by an electrode installed in the vessel 1.

The sight glass, constant voltage generation device, and electrode were used to verify the bubble separation effect. They are not always necessary for the method or device of the invention.

Figure 2:
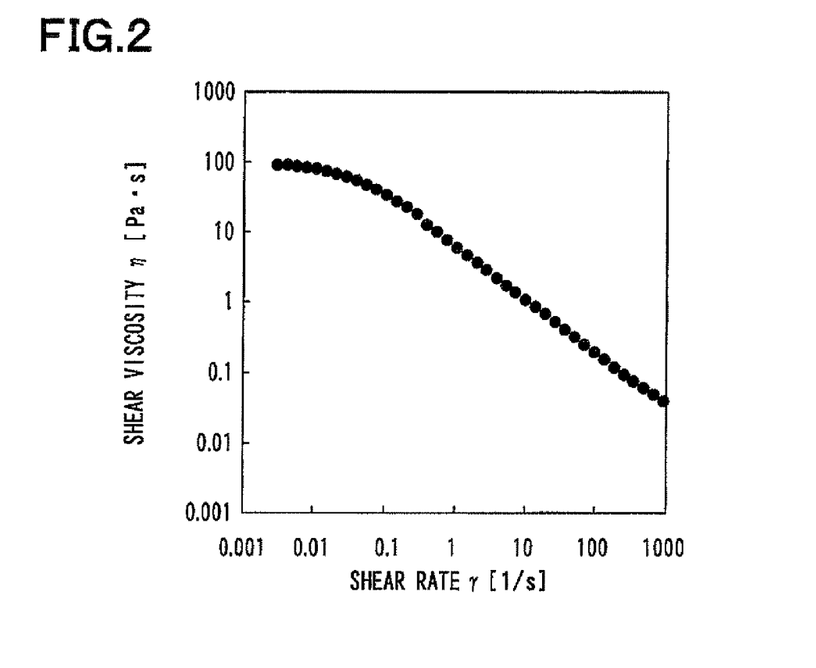
FIG. 2 is a drawing indicating the rheological characteristics of a solution in the first embodiment of the invention.

The sample (highly viscous fluid) used to describe this embodiment is a 0.700 wt % sodium polyacrylate solution and FIG. 2 indicates its viscosity curve. As seen from FIG. 2, the sample (0.700 wt % sodium polyacrylate solution) has such properties (shear thinning properties) that its shear viscosity is reduced with increase in shear rate.

One of preferred embodiments of continuous defoaming is that the viscosity of a solution is reduced by shear. In other words, a liquid whose viscosity is reduced when shear occurs is suitable for the solution.

The solution is not limited to a liquid whose solution viscosity is reduced by shear over all the range of shear rate. Any liquid is acceptable as long as the viscosity of its solution is reduced by shear within part of the range of shear rate. That is, a liquid is acceptable as long as the viscosity of its solution is reduced within the range of the rate of shear that occurs in proximity to a bubble. Therefore, non-Newtonian liquid, Bingham plastic fluid, and the like are suitable for the solution.

However, also in Newtonian fluid whose viscosity does not depend on shear, the defoaming effect of this embodiment can be expected. Any viscous fluid such as paint, coating agent, polymer, paste, and slurry is acceptable as long as it meets these requirements for viscous fluid.

This embodiment uses 300 Hz for a frequency at which oscillation is given. Any frequency is acceptable as long as it is a low frequency of 4000 Hz or below. For example, 150 Hz is also acceptable. That is, the fluid viscosity in proximity to a bubble only has to be reduced by shear and this relates to both the frequency of oscillation and a pressure fluctuation range.

The movement characteristics of a bubble were compared with respect to a case where pressure oscillation of 300 Hz was given and a case where it was not given. Strobe light is applied from the back side of FIG. 1 with a frequency of 300.86 Hz and the outcome was shot with a high-resolution digital video camera set on the near side of the drawing. Using the two electronic balances, the flow rate at each outlet was measured.

First, the valve opening of each of the valves 8, 9 on the downstream side (outlets A, B side) was adjusted so that a bubble flowed to the outlet B under constant pressure condition without the application of pressure oscillation. The opening of the valve 7 on the upstream side (inlet side) was also narrowed down to provide a differential pressure. 100% is taken as the full opening of each of the valves 7, 8, 9. In this example, the opening of the valve 7 on the inlet side was narrowed down to 4%; the opening of the valve 8 on the outlet A side was narrowed down to 1.3%; and the opening of the valve 9 on the outlet B side was narrowed down to 2.6%.

Figure 3:
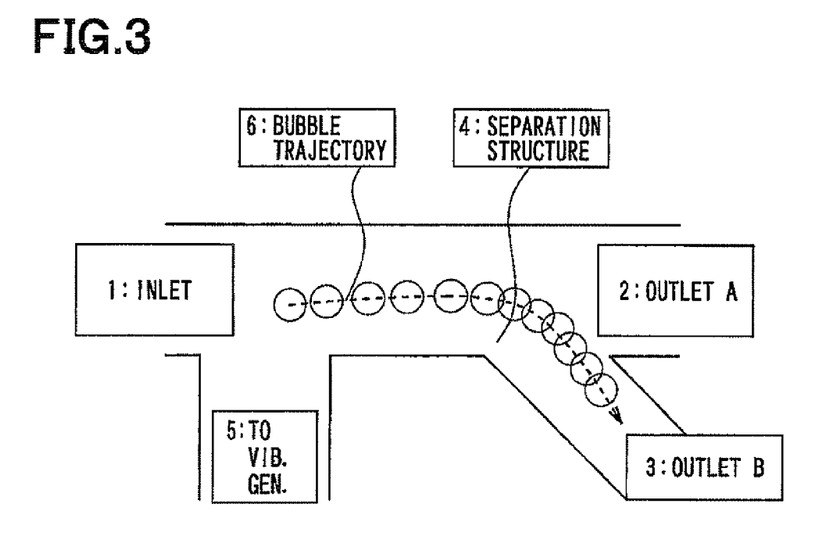
FIG. 3 is a drawing indicating the trajectory of a bubble under constant pressure condition in the first embodiment of the invention.

At this time, the supply flow rate was 2.2 ml/min and the flow ratio of outlet A:outlet B was 1:3. FIG. 3 indicates the trajectory of a bubble in the vessel under constant pressure. The bubble diameter was 1.94 mm and the bubble naturally ascended and went toward the outlet A. Since the amount of liquid flowing to the outlet B was large, however, the bubble eventually moved to the outlet B.

Figure 4:
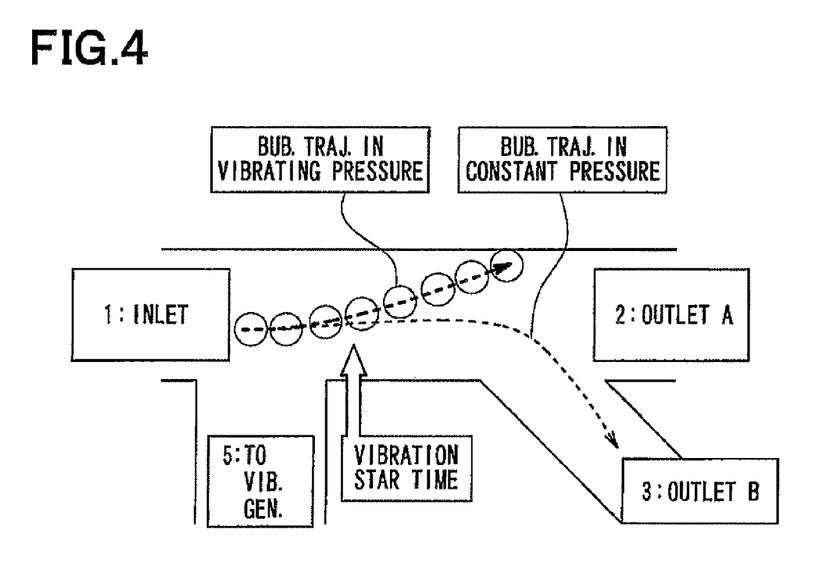
FIG. 4 is a drawing indicating the trajectory of a bubble under pressure oscillation condition in the first embodiment of the invention.

FIG. 4 indicates the trajectory of a bubble observed when the constant pressure condition and the flow rate were set as mentioned above and pressure oscillation was given. The broken line in the drawing indicates the above-mentioned trajectory of the bubble in FIG. 3. Immediately after the start of the experiment, the solution was let to flow under constant pressure and the bubble moved along the same trajectory as in FIG. 3. When the application of pressure oscillation was started, the bubble moved to the upper part of the vessel and arrived at the wall surface of the vessel unlike the trajectory in FIG. 3. Thereafter, the bubble moved toward the outlet A. It was assumed that the liquid that flowed out of the outlet B was the processed liquid (product) of the continuous defoaming device and it was demonstrated that bubbles can be removed by the invention.

In this embodiment, the piping areas are connected to the vessel 1 and the vessel 1 is not sealed. In the unsealed vessel 1 like this, the following takes place whether the valves 7, 8, 9 are not installed or the valves 7, 8, 9 are installed and when the valve opening of each of the valves 7, 8, 9 is set to a large value: when the volumetric capacity of the vessel 1 is increased and reduced by the vibration generator 2, the liquid accordingly moves between the inside and the outside of the vessel 1; therefore, the interior of the vessel 1 cannot be depressurized or pressurized.

In this embodiment, the valve opening of each of the valves 7, 8, 9 is significantly narrowed down to significantly increase the flow resistance. Therefore, when the volumetric capacity of the vessel 1 is increased and reduced, the movement of liquid between the inside and the outside of the vessel 1 in conjunction therewith can be suppressed. Specifically, when the volumetric capacity of the vessel 1 is increased, the inflow of liquid to the vessel 1 can be suppressed; and when the volumetric capacity of the vessel 1 is reduced, the outflow of liquid from the vessel can be suppressed. For this reason, the interior of the non-closed vessel 1 can be depressurized and pressurized.

As a result, the volume of a bubble contained in viscous fluid can be increased and reduced as in PTL 5 in which the vessel is closed. When the volume of a bubble is increased and reduced, a shear flow is produced around the bubble. Since the apparent viscosity of the viscous fluid is reduced by this shear, the viscosity resistance against the natural ascent of the bubble is reduced and the natural ascending speed of the bubble is increased.

Since the high-pressure micro feeder 3 pressure-feeds liquid against the flow resistance of each of the valves 7, 8, 9, the liquid can flow through the vessel 1 from the inlet to the outlets A, B at a substantially constant flow rate. For this reason, the bubble can be moved toward the outlet A and thus the viscous fluid with the bubble removed flows out of the outlet B.

According to this embodiment, the flow rate of liquid is kept substantially constant (the amount of liquid in the vessel 1 is kept substantially constant) even when the volumetric capacity of the vessel 1 is increased or reduced. Therefore, the internal pressure of the vessel is reduced or reduced by increasing or reducing the volumetric capacity of the vessel 1.

For this reason, it is possible to achieve both passing liquid through the non-closed vessel 1 and increasing and reducing the volumetric capacity of the vessel 1 to depressurize and pressurize the interior of the vessel. Bubbles can be thereby continuously removed. Therefore, bubbles can be more efficiently removed than with the batch bubble removal methods using a closed vessel as in PTL 5.

Second Embodiment

Figure 5:
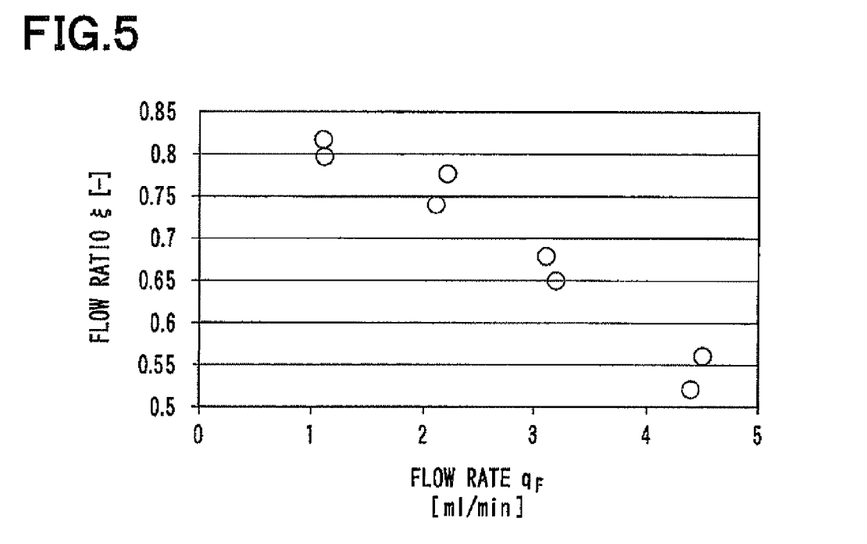
FIG. 5 is a drawing showing a case where bubbles are successfully separated by giving pressure oscillation in a second embodiment of the invention.

In the second embodiment, the flow ratio $\xi(=q_B/(q_A+q_B))$ of the flow rate at the outlet A and the flow rate at the outlet B was changed as indicated in FIG. 5. The flow rate $q_F$ is the flow rate at the inlet and is equivalent to the sum of the flow rate at the outlet A and the flow rate at the outlet B. First, under constant bubble pressure condition, the flow ratio $\xi$ was set so that a bubble was mixed in the liquid at the outlet B, that is, the liquid processed by the continuous defoaming device. Subsequently, under the same flow rate condition, pressure oscillation of 300 Hz was given. Then bubbles were discharged to the outlet A under all the conditions shown in FIG. 5.

Third Embodiment

Figure 6:
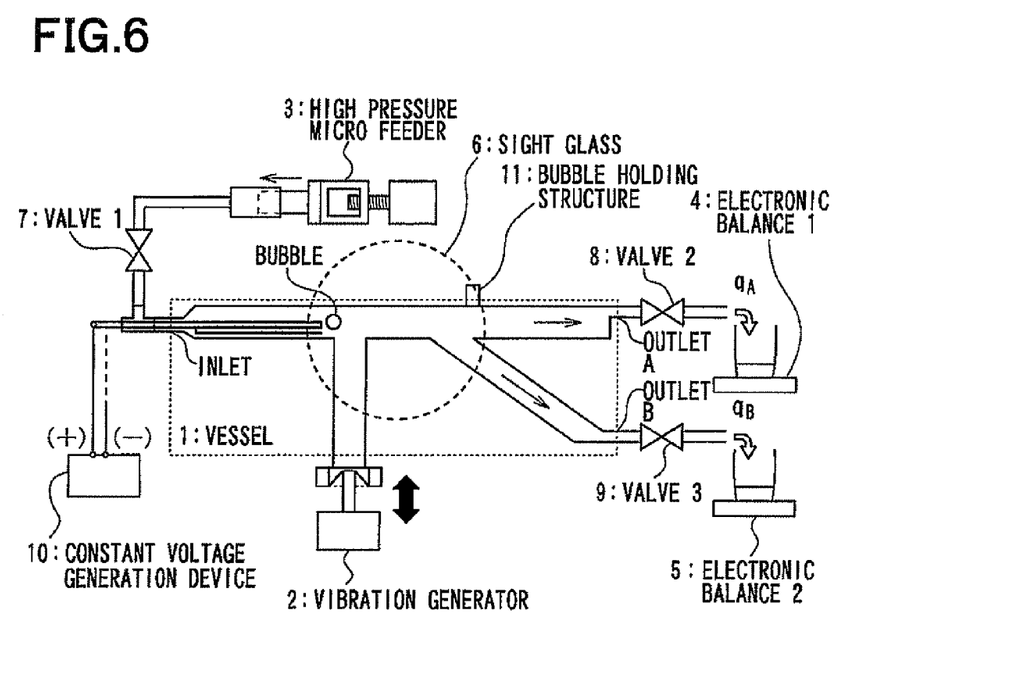
FIG. 6 is a drawing illustrating the overall configuration of a continuous defoaming device in a third embodiment of the invention.

In the third embodiment, as illustrated in FIG. 6, a structure 11 for holding a bubble was additionally installed in proximity to the outlet A of the vessel 1 in addition to the continuous bubble separation device illustrated in FIG. 1. Gas was placed on this holding structure 11. The gas holding structure was connected to the flow path of the vessel 1.

Figure 7:
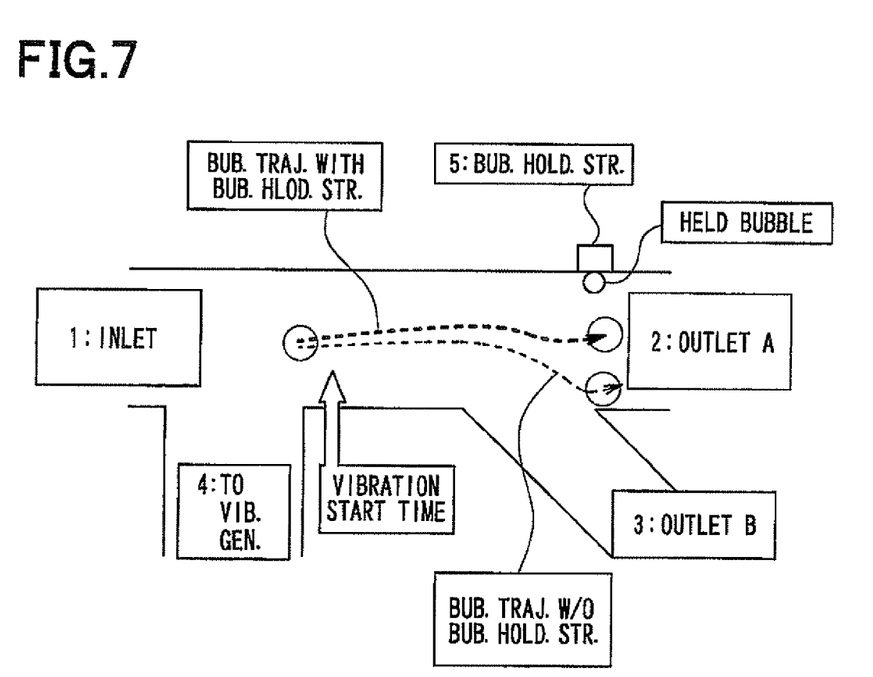
FIG. 7 is a drawing comparing the positions to which a bubble is moved depending on the presence or absence of a structure for holding gas under pressure oscillation condition in the third embodiment of the invention.

A bubble was produced in the vessel as in the first embodiment. At this time, the supply flow rate was 2.2 ml/min and the flow ratio of outlet A:outlet B was 1:3. These conditions were kept constant and pressure oscillation of 300 Hz was given. When the gas holding structure 11 was not installed, a bubble moved to the vicinity of the front edge of the flow path bifurcation area as illustrated in FIG. 7. When the gas holding structure 11 was used, a bubble moved to a higher part of the vessel and the enhancement of separation performance was demonstrated.

In principle, the gas holding structure only has to suppress excessive increase or reduction in the pressure in the vessel. In place of the gas holding structure, an object (for example, a balloon) covered with a film that elastically responds to increase or reduction in pressure (pressure oscillation) may be installed in the flow path on the outlet A side of the vessel 1.

The first to third embodiments are bubble removal methods for removing a bubble from liquid whose viscosity is reduced when shear occurs.

These methods are characterized in that:

using a vessel, including a liquid inlet and a plurality of liquid outlets, whose volumetric capacity is variable and a means for giving resistance to the passage of the liquid between inside and outside of the vessel;

causing the liquid to pass through the vessel against the resistance and increasing and decreasing the volumetric capacity of the vessel; and causing the means for giving resistance to the passage of liquid to depressurize and pressurize an interior of the vessel in conjunction with increase and reduction in the volumetric capacity of the vessel.

This makes it possible to achieve both passing liquid through the vessel and increasing and reducing the volumetric capacity of the vessel to depressurize and pressurize the interior of the vessel. For this reason, the natural ascending speed of a bubble can be increased by increasing and reducing the volume of the bubble contained in liquid passing through the vessel and thus the bubble can be efficiently removed.

The first to third embodiments are bubble removal methods in which the following is implemented: using a vessel so structured that it includes one or more inlets and two or more outlets and its volumetric capacity is variable, non-Newtonian liquid is passed through the vessel; the volumetric capacity of the non-Newtonian liquid in the vessel is varied by vibration to depressurize and pressurize the interior of the vessel; and the volume of a bubble contained in the non-Newtonian liquid is thereby increased and reduced to move the bubble to a specific outlet and bubbles are thereby continuously removed.

The bubble removal methods are characterized in that pressure change in the vessel is held by a means for maintaining the resistance of a flow provided at each of the inlet portion and the outlet portion and the interior of the vessel is depressurized and pressurized.

This makes it possible to obtain the same action and effect.

The third embodiment is characterized in that a means for holding gas in part of a flow containing the bubble or a means for suppressing excessive pressure increase or pressure decrease in the vessel is provided and bubbles are continuously removed.

This makes it possible to move a bubble to a higher part of the vessel and thus bubbles can be efficiently removed.

In the first to third embodiments, it is desirable that the volumetric capacity of the vessel is increased and reduced by low-frequency oscillation.

In the first to third embodiments, specifically, the structure of the flow path in the vessel is provided with a means for bifurcating a flow into a flow containing a bubble and a flow not containing a bubble. Bubbles are thereby continuously removed.

The first to third embodiments are characterized in that they include:

a vessel, including a liquid inlet and a plurality of liquid outlets, whose volumetric capacity is variable;

a volumetric capacity varying means that is actuated for the vessel and increases and reduces the volumetric capacity of the vessel; and a means for giving resistance to the passage of the liquid between the inside and the outside of the vessel so that, when the volumetric capacity varying means increases and reduces the volumetric capacity of the vessel, an interior of the vessel is depressurized and pressurized.

This makes it possible to obtain the same action and effect.

In the first to third embodiments, it is desirable that the volumetric capacity varying means increases and reduces the volumetric capacity of the vessel by low-frequency oscillation.

In the first to third embodiments, specifically, the following is implemented:

the structure whose volumetric capacity is variable is formed by part of the vessel being an elastic body; and the volumetric capacity varying means elastically deforms the elastic body.

The first to third embodiments include a means for pressure feeding liquid so that the liquid passes through the vessel against resistance.

In the first to third embodiments, specifically, the following is implemented:

the multiple liquid outlets include an upper outlet positioned at the upper part of the vessel and a lower outlet positioned below the upper outlet; and a bubble is moved to the upper outlet by depressurizing and pressurizing the interior of the vessel.

The first to third embodiments are bubble removal devices comprising:

a vessel so structured that it includes one or more inlets and two or more outlets and its volumetric capacity is variable; and a vibration generator for varying the volume of viscous fluid in the vessel to depressurize and pressurize the interior of the vessel, the bubble removal devices being a bubble removal methods comprising depressurizing and pressurizing the interior of the vessel by varying the volume of viscous fluid flowing through the vessel by vibration, thereby increasing and reducing the volume of a bubble contained in the viscous fluid to move the bubble to a specific outlet and continuously removing bubbles.

The bubble removal devices are characterized in that a means for maintaining the resistance of a flow is further provided at each of the inlet portion and the outlet portion to hold pressure change in the vessel.

This makes it possible to obtain the same action and effect.

In the first to third embodiments, it is desirable that the vibration is low-frequency oscillation.

The third embodiment is characterized in that it includes a means for holding gas in part of a flow containing a bubble or a means for suppressing excessive pressure increase or pressure decrease in the vessel.

This makes it possible to move a bubble to a higher part of the vessel and thus efficiently remove the bubble.

In the third embodiment, specifically, the means for suppressing pressure increase or pressure decrease elastically responds to increase and reduction in pressure.

In the first to third embodiments, specifically, the structure of the flow path in the vessel includes a structure for bifurcating a flow into a flow containing a bubble and a flow not containing a bubble.

The invention claimed is:

1. A bubble removal method for removing bubbles from liquid whose viscosity is reduced when shear occurs, comprising:

using (1) a vessel that includes a liquid inlet and a plurality of liquid outlets and that has a variable volumetric capacity; (2) a device configured to increase and decrease the volumetric capacity of the vessel; and (3) a device configured to give resistance to passage of the liquid between inside and outside of the vessel;
causing the liquid to pass through the vessel against the resistance;
increasing and decreasing, by using the device configured to increase and decrease the volumetric capacity of the vessel, the volumetric capacity of the vessel; and
causing the device configured to increase and decrease the volumetric capacity of the vessel and the device configured to give resistance to passage of liquid to depressurize and pressurize an interior of the vessel in conjunction with increase and decrease in the volumetric capacity of the vessel.

2. The bubble removal method according to claim 1, further comprising:
preparing a device configured to hold gas in part of a flow containing a bubble or providing a device configured to suppress excessive pressure increase or excessive pressure decrease in the vessel; and
removing the bubbles continuously.

3. The bubble removal method according to claim 1, wherein:
the volumetric capacity of the vessel is increased and decreased by low-frequency oscillation.

4. The bubble removal method according to claim 1, wherein:
a structure of a flow path in the vessel includes a device configured to bifurcate a flow into a flow containing a bubble and a flow not containing a bubble; and
the bubbles are continuously removed.

5. A bubble removal method using a vessel so structured that (1) the vessel includes one or more inlets and two or more outlets and has a variable volumetric capacity, (2) non-Newtonian liquid is passed through the vessel, and (3) an interior of the vessel is depressurized and pressurized by varying the volumetric capacity of the non-Newtonian liquid in the vessel by vibration, a volume of bubbles contained in the non-Newtonian liquid thereby being increased and decreased to move the bubbles to a specific outlet of the vessel, and the bubbles thereby being continuously removed, the bubble removal method comprising:
depressurizing and pressurizing the interior of the vessel while holding pressure change in the vessel by a device configured to maintain resistance of a flow provided at each of the one or more inlets and the two or more outlets.

6. The bubble removal method according to claim 5, further comprising:
preparing a device configured to hold gas in part of a flow containing a bubble or providing a device configured to suppress excessive pressure increase or excessive pressure decrease in the vessel; and
removing the bubbles continuously.

7. The bubble removal method according to claim 5, wherein:
the volumetric capacity of the vessel is increased and decreased by low-frequency oscillation.

8. The bubble removal method according to claim 5, wherein:
a structure of a flow path in the vessel includes a device configured to bifurcate a flow into a flow containing a bubble and a flow not containing a bubble; and
the bubbles are continuously removed.

9. A bubble removal device comprising:
a vessel that includes a liquid inlet and a plurality of liquid outlets and that has a variable volumetric capacity;
a volumetric capacity varying device that is actuated for the vessel and that increases and decreases the volumetric capacity of the vessel; and
a device configured to give resistance to passage of liquid between inside and outside of the vessel so that, when the volumetric capacity varying device increases and decreases the volumetric capacity of the vessel, an interior of the vessel is depressurized and pressurized.

10. The bubble removal device according to claim 9, wherein:
the volumetric capacity varying device is configured to increase and decrease the volumetric capacity of the vessel by low-frequency oscillation.

11. The bubble removal device according to claim 10, wherein:
a structure whose volumetric capacity is variable is formed by part of the vessel being an elastic body, and
the volumetric capacity varying device elastically deforms the elastic body.

12. The bubble removal device according to claim 10, comprising:
a device configured to pressure feed the liquid so that the liquid passes through the vessel against the resistance.

13. The bubble removal device according to claim 10, wherein:
the liquid outlets include an upper outlet positioned at an upper part of the vessel and a lower outlet positioned below the upper outlet, and
a bubble is moved to the upper outlet by depressurizing and pressurizing the interior of the vessel.

14. The bubble removal device according to claim 10, comprising:
a device configured to hold gas in part of a flow containing a bubble or a device configured to suppress excessive pressure increase or pressure decrease in the vessel.

15. The bubble removal device according to claim 14, wherein:
the device configured to suppress excessive pressure increase or pressure decrease is configured to elastically respond to increase and decrease in pressure.

16. The bubble removal device according to claim 10, wherein:
structure of a flow path in the vessel includes a structure configured to bifurcate a flow into a flow containing a bubble and a flow not containing a bubble.

17. The bubble removal device according to claim 9, wherein:
a structure whose volumetric capacity is variable is formed by part of the vessel being an elastic body, and
the volumetric capacity varying device elastically deforms the elastic body.

18. The bubble removal device according to claim 9, comprising:
a device configured to pressure feed the liquid so that the liquid passes through the vessel against the resistance.

19. The bubble removal device according to claim 9, wherein:
the liquid outlets include an upper outlet positioned at an upper part of the vessel and a lower outlet positioned below the upper outlet, and
a bubble is moved to the upper outlet by depressurizing and pressurizing the interior of the vessel.

20. The bubble removal device according to claim 9, comprising:
a device configured to hold gas in part of a flow containing a bubble or a device configured to suppress excessive pressure increase or pressure decrease in the vessel.

21. The bubble removal device according to claim 20, wherein:
the device configured to suppress excessive pressure increase or pressure decrease is configured to elastically respond to increase and decrease in pressure.

22. The bubble removal device according to claim 9, wherein:
structure of a flow path in the vessel includes a structure configured to bifurcate a flow into a flow containing a bubble and a flow not containing a bubble.

23. A bubble removal device comprising:
a vessel that includes one or more inlets and two or more outlets and that has a variable volumetric capacity;
a device configured to maintain resistance of a flow at each of the one or more inlets and the two or more outlets to hold pressure change in the vessel; and
a vibration generator configured to vary the volumetric capacity of viscous fluid in the vessel to depressurize and pressurize an interior of the vessel, wherein:
the interior of the vessel is depressurized and pressurized by varying the volume of viscous fluid flowing through the vessel by vibration, thereby increasing and decreasing the volume of a bubble contained in the viscous fluid to move the bubble to a specific outlet of the vessel and continuously removing bubbles.

24. The bubble removal device according to claim 23, wherein:
the vibration generator is configured so that the vibration is low-frequency oscillation.

25. The bubble removal device according to claim 24, comprising:
a device configured to hold gas in part of a flow containing the bubble or a device configured to suppress excessive pressure increase or pressure decrease in the vessel.

26. The bubble removal device according to claim 25, wherein:
the device configured to suppress excessive pressure increase or pressure decrease is configured to elastically respond to increase and decrease in pressure.

27. The bubble removal device according to claim 24, wherein:
structure of a flow path in the vessel includes a structure configured to bifurcate a flow into a flow containing a bubble and a flow not containing a bubble.

28. The bubble removal device according to claim 23, comprising:
a device configured to hold gas in part of a flow containing the bubble or a device configured to suppress excessive pressure increase or pressure decrease in the vessel.

29. The bubble removal device according to claim 28, wherein:
the device configured to suppress excessive pressure increase or pressure decrease is configured to elastically respond to increase and decrease in pressure.

30. The bubble removal device according to claim 23, wherein:
structure of a flow path in the vessel includes a structure configured to bifurcate a flow into a flow containing a bubble and a flow not containing a bubble.

* * * * *